(12) United States Patent
Larson et al.

(10) Patent No.: US 12,350,642 B2
(45) Date of Patent: Jul. 8, 2025

(54) SINGLE PASS HEADER FOR GENERATING SULFUR SEED PARTICLES AND ENLARGING SULFUR GRANULES, AND METHOD OF USING THE SAME

(71) Applicant: Enersul Inc., Calgary (CA)

(72) Inventors: Paul Roy Larson, Calgary (CA); Ioana Todea, Calgary (CA)

(73) Assignee: Enersul, Inc., Calgary (CA)

( * ) Notice: Subject to any disclaimer, the term of this patent is extended or adjusted under 35 U.S.C. 154(b) by 0 days.

(21) Appl. No.: 17/908,471

(22) PCT Filed: Mar. 23, 2022

(86) PCT No.: PCT/CA2022/050431
§ 371 (c)(1),
(2) Date: Aug. 31, 2022

(87) PCT Pub. No.: WO2022/198318
PCT Pub. Date: Sep. 29, 2022

(65) Prior Publication Data
US 2024/0189789 A1    Jun. 13, 2024

Related U.S. Application Data

(60) Provisional application No. 63/165,453, filed on Mar. 24, 2021.

(51) Int. Cl.
*B01J 2/04* (2006.01)
*B01J 2/12* (2006.01)
*C01B 17/02* (2006.01)

(52) U.S. Cl.
CPC .................. *B01J 2/12* (2013.01); *B01J 2/04* (2013.01); *C01B 17/0216* (2013.01); *C01B 17/0237* (2013.01)

(58) Field of Classification Search
CPC ........... B01J 2/12; B01J 2/04; C01B 17/0216; C01B 17/0237
See application file for complete search history.

(56) References Cited

U.S. PATENT DOCUMENTS 3,903,333 A    9/1975  Shirley
3,991,225 A    11/1976 Blouin
(Continued)

FOREIGN PATENT DOCUMENTS

CA    1129182    8/1982
CA    1148726    6/1983
(Continued)

OTHER PUBLICATIONS

International Preliminary Report on Patentability for PCT patent application No. PCT/CA2022/050431.

*Primary Examiner* — Emmanuel S Luk
(74) *Attorney, Agent, or Firm* — DeLio Peterson & Curcio LLC; Robert Curcio (57) ABSTRACT

A header design for an efficient single pass enlargement process of sulfur granules having two internal piping structures within an external header conduit for delivering separate molten sulfur liquid streams to different sets of nozzles, wherein a first set of nozzles is subjected to flow streams and pressures uniquely different from a second set of nozzles. A water header design may also include two internal piping structures inside an external pipe casing for delivering water in at least two sets of nozzles, wherein the first set is subjected to flow streams and pressures different from the second set. A method of sulfur seed generation and sulfur granule enlargement for processing sulfur, employing a unique sulfur header design with dual internal piping structures, and possibly utilizing in tandem a water header design having a dual internal piping structure for feeding two sets of nozzles.

12 Claims, 12 Drawing Sheets

(56) References Cited

U.S. PATENT DOCUMENTS

| | | | |
|---|---|---|---|
| 4,234,318 | A | 11/1980 | Higgins et al. |
| 4,272,234 | A | 6/1981 | Tse |
| 4,353,852 | A | 10/1982 | Tse |
| 4,507,335 | A | 3/1985 | Mathur |
| 4,857,098 | A | 8/1989 | Shirley, Jr. |
| 5,108,034 | A * | 4/1992 | Huey ..................... B05B 1/24 264/5 |
| 5,435,945 | A | 7/1995 | De Paoli et al. |
| 5,809,885 | A * | 9/1998 | Koch ..................... B41F 21/00 101/232 |
| 6,716,015 | B2 | 4/2004 | Lumley et al. |
| 8,329,072 | B2 | 12/2012 | Lang et al. |
| 2011/0140294 | A1 | 6/2011 | Pyke et al. |

FOREIGN PATENT DOCUMENTS

| | | |
|---|---|---|
| CA | 1158022 | 12/1983 |
| CA | 1205978 | 6/1986 |
| CA | 2170021 | 8/1994 |
| CA | 2364023 | 11/2001 |
| CA | 1070928 | 2/2008 |
| CA | 1080694 | 7/2008 |
| CA | 2729462 | 12/2009 |

\* cited by examiner

SECTION C-C

SECTION C1-C1

FIG. 11

SECTION C-C

INSULATION WRAP

SINGLE PASS HEADER FOR GENERATING SULFUR SEED PARTICLES AND ENLARGING SULFUR GRANULES, AND METHOD OF USING THE SAME

BACKGROUND OF THE INVENTION

1. Field of the Invention

This invention relates to the field of converting molten sulfur (sulphur) into solid sulfur granules using sulfur seeds. More specifically, the present invention relates to an improved header design that enables an efficient single pass enlargement process of sulfur granules, eliminates the need for a recycle conveyor, and presents a much smaller footprint of the particulate sulfur granulation process machinery for installation and operation.

DESCRIPTION OF RELATED ART

The prior art discloses a number of processes for the production of particulate sulfur. In one type of process, sulfur may be melted and the molten sulfur dispersed, or dropped in globular form into a cooling medium such as a gas or liquid, whereby the molten sulfur solidifies in the form of solid globules or prills. Alternatively, molten sulfur may be solidified in a layer which may be flaked or crushed to produce particulate sulfur. Another process for producing particulate sulfur is by compaction of finely divided solid sulfur in the presence of a binder. Still other processes involve the prilling or pelletization of liquid sulfur in a fluidized or spouted bed.

In a prevalent process, the production of granular sulfur is performed within a rotating drum in which molten sulfur at an elevated temperature is sprayed in a contact zone onto a bed of moving sulfur particles (seeds) and a continuous curtain of the particles. Discharge particles are generally separated according to size and undersized particles are recycled as fines.

This type of granulation process initiates size enlargement to transform molten sulfur into dense spherical solid granules. Small particles of sulfur (seed) are sprayed and coated with molten sulfur as the product moves through a rotating drum. Each applied layer is cooled to solidification before another coat of molten sulfur is applied. With repeated application, bonding, and then cooling of successive coats, the seeds increase in volume and weight until they reach a desired granule size.

A bed of moving solid particles of sulfur (seeds) are formed and maintained in a rotating, substantially horizontal, elongated drum, where finely divided solid particles of sulfur are added to the bed.

The small solid sulfur seeds (the nuclei of the granules) are generated by freezing sprays of liquid sulfur in a water tank at controlled pressures to form the desired size range. These particles settle at the bottom of the water tank and are then gently transported into the granulation drum with a screw conveyor.

Once inside the drum, the particles are advanced through a contact zone, and solid particles from the bed are continuously raised to the upper region of the contact zone. The drum has flights attached to its inner surface that pick up the seeds and drop them to create falling curtains of particles inside the drum.

The raised solid particles are then released and allowed to cascade downward through the contact zone onto the bed as a continuous curtain of solid sulfur particles, extending substantially the length of the contact zone. In separate streams, molten sulfur is sprayed at an elevated temperature generally within the range of about 110° ° C. to about 160° C. onto the bed and into the curtain of solid particles, while water is simultaneously streamed to the curtain of particles cascading downwardly through the contact zone. The water streams inside the drum constantly cool the sulfur granules. The hot temperature inside the drum (in excess of 100° C.) is due to the heat emitted from the sulfur granules. This heat vaporizes the water droplets and exits the drum through exhaust fans. In this way, the fans remove the excess water vapor and ultimately control the temperature of the air inside the drum. The vaporized water that exits the drum also carries a small amount of sulfur dust. A dry steam filter then separates these dust particles and re-melts them for incorporation into the production of more sulfur. Such a process has been developed and described in U.S. Pat. No. 4,234,318 issued to Higgins, et al., titled "PROCESS FOR GRANULATION OF SULFUR."

The liquid sulfur is supplied to the granulation system via a heated piping system. The sulfur flow may then be split into two streams, one stream to the seed generation system and the other stream to the rotating drum. Granulation takes place when liquid sulfur is sprayed onto a seed curtain to form the larger sulfur particles.

The seeds are progressively enlarged to the final product size by coating them multiple times with sprays of liquid sulfur inside the drum. The temperature inside the drum is moderated by the evaporation of water, which is provided by water spray nozzles. With every added coat of molten sulfur the particles increase in size and weight until they finally reach a desired diameter of approximately 2 mm to 6 mm, and are discharged onto a collecting conveyor.

In U.S. Pat. No. 5,435,945 issued to De Paoli, et al., on Jul. 25, 1995, titled 'METHOD AND APPARATUS FOR GENERATING SULPHUR SEED PARTICLES FOR SULPHUR GRANULE PRODUCTION" (the "'945 patent"), sulfur granulation is taught using intersecting sprays of water droplets and liquid sulfur droplets. A spray of water droplets is discharged to intersect a spray of liquid sulphur droplets to effect contact between some of the sulphur droplets and water droplets. The cooling sulphur droplets form seed particles used to initiate sulfur granule generation. In another technique, water is sprayed into dispersed sulphur granules moving through a processing region. Subsequently, as the water is evaporating from the granules, liquid sulphur is sprayed onto the granules. Some of the liquid sulphur droplets impinge upon the water film-coated granules and solidify to form new seed particles which become detached from the granules.

The apparatus of the '945 patent teaches a spray of water droplets and a spray of liquid sulfur droplets discharged to intersect. The sulfur and water droplets are independently sprayed from separate sets of nozzles in different directions. The nozzles are positioned in a sulfur granulation drum so that the nozzles are adjacent a curtain of falling granules (and previously generated seed particles) and so that some of the liquid sulfur droplets also pass through the spray of water droplets into the current of the falling granules and seed particles.

Figure 1:
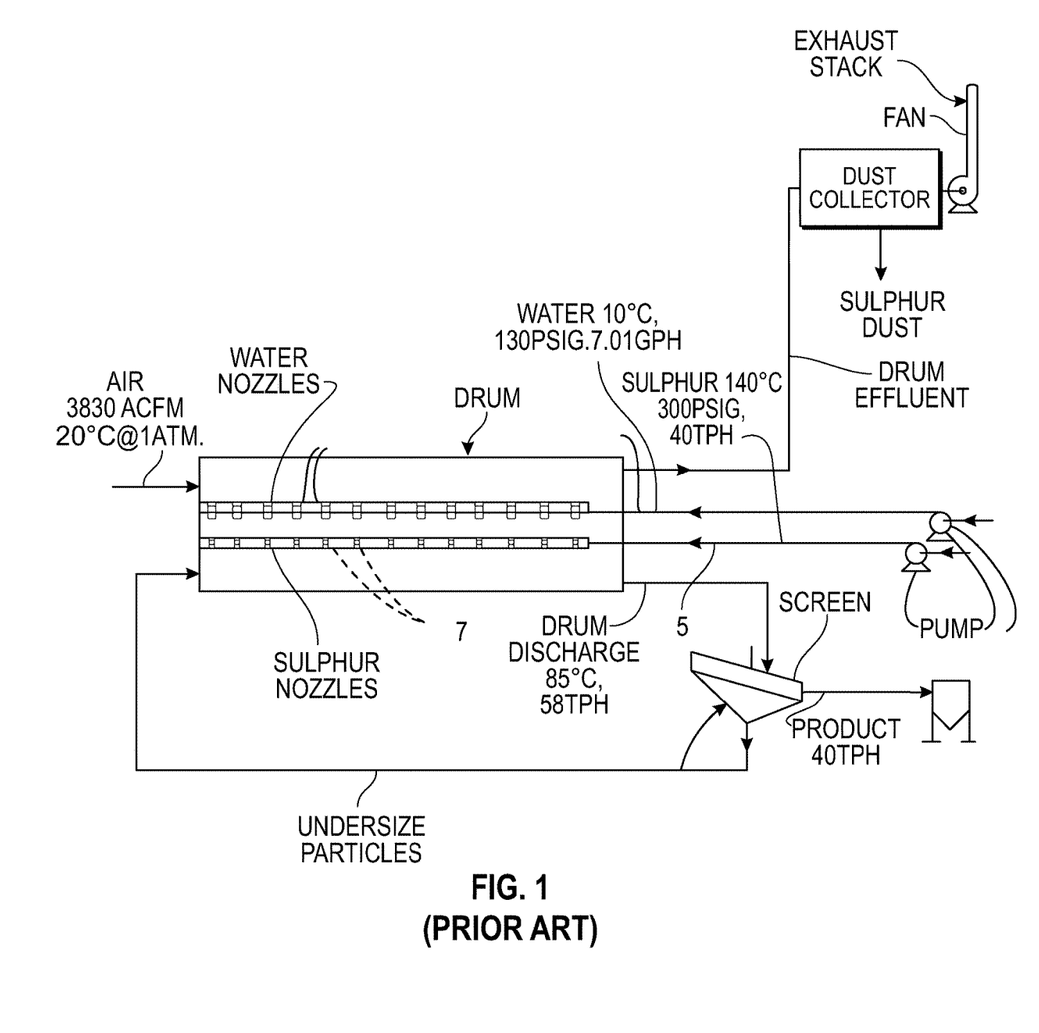
FIG. 1 depicts a prior art schematic diagram of a sulfur granulation system.

A plurality of jets of atomizing fluid are injected into the stream to form a spreading spray of liquid sulphur droplets which solidify into seed particles. The collection of the plurality of jets are generally referred to as "headers". The headers typically have a central orifice for discharging a stream of liquid under pressure, and a plurality of orifices, which are laterally offset from the central orifice for injecting jets of an atomizing fluid into a second stream. FIG. 1 below depicts a prior art schematic diagram of a sulfur granulation system (FIG. 4 of U.S. Pat. No. 5,435,945).

In FIG. 1, a series of liquid sulfur spray nozzles 7 are spaced along a header 5 in fluid communication therewith. In this configuration, the sulfur nozzles are aligned generally horizontally and are oriented to direct sprays of liquid sulfur droplets towards the falling curtains of seed particles and granules.

The water spray and the sulfur spray may be oriented at an oblique angle. Generally, the shower of falling sulfur particles and granules are sprayed with water as they fall through the processing region spaced above the liquid sulfur spray.

As depicted in FIG. 1 above, each header is designed with a plurality of linearly spaced nozzles running longitudinally (axially) down the drum along the header. The header is fed from a single input conduit. A deficiency of this prior art design is that it does not lend itself to a one pass enlargement process that would otherwise reduce the need for a size-segregating screen and return conveyor belt for undersized seeds and granules.

SUMMARY OF THE INVENTION

One aspect of the present invention is to provide a novel header design for continuously generating sulfur granules from seed particles used in a process of spraying the seed particles with liquid sulfur and water to form sulfur granules larger than the seed particles.

More specifically, the header designs for both sulfur spray and water spray discharge their respective streams to intersect one another, employing longitudinally spaced nozzles separated by source conduit lines within each single header design.

Bearing in mind the problems and deficiencies of the prior art, it is therefore an object of the present invention to provide a sulfur header assembly having two internal piping structures within an external pipe casing for delivering separate molten sulfur liquid streams to different sets of nozzles, wherein a first set of nozzles is subjected to flow streams and pressures uniquely different from a second set of nozzles.

It is another object of the present invention to provide a water header assembly working in tandem with a sulfur header assembly, where the water header assembly includes an internal piping structure within an external pipe casing for delivering water streams to different sets of nozzles, wherein a first set of nozzles is subjected to flow streams and pressures uniquely different from a second set of nozzles.

It is yet another object of the present invention to provide a sulfur generating system that incorporates seed generation and sulfur granule enlargement within a single header assembly design.

It is another object of the present invention to provide a method for sulfur generation that incorporates seed generation and sulfur granule enlargement within a single header assembly design.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-17 of the drawings in which like numerals refer to like features of the invention.

While the present invention is capable of different embodiments in many forms, this specification and the accompanying drawings disclose some specific forms as exemplary embodiments. The invention is not intended to be limited to the embodiments so described.

For ease of description, the apparatus of this invention is described in normal (upright) operating position, and terms such as upper, lower, horizontal, longitudinal, etc., are used with such positional reference.

The apparatus for producing sulfur granules includes a "granulator" with a rotatable drum having zones for seed generation and product (granule) enlargement. The particles may be referred to herein as granular solids, granules, or product. For illustrative purposes, the preferred processing fluid is molten sulfur for forming sulfur granules, although the apparatus is not limited solely to forming granules of sulfur, and other granules may be processed in a similar manner.

The present granulation process involves the introduction of sulfur from a sulfur source, such as a sour gas processing plant, to a heated reservoir of molten sulfur. Likewise, a cooling fluid, usually water, is kept in another reservoir and replenished as required from its own source, such as a water well.

The molten sulfur and the water are separately piped into the granulator, which is primarily a rotating drum having flights to carry sulfur particles during drum rotation. The sulfur particles, seeds, and granules are individually dispersed into predetermined spray patterns within the rotating drum. Sulfur particles and seeds are enlarged to a desired, predetermined size range and then exit the drum for onsite storage and/or transport.

Figure 2:
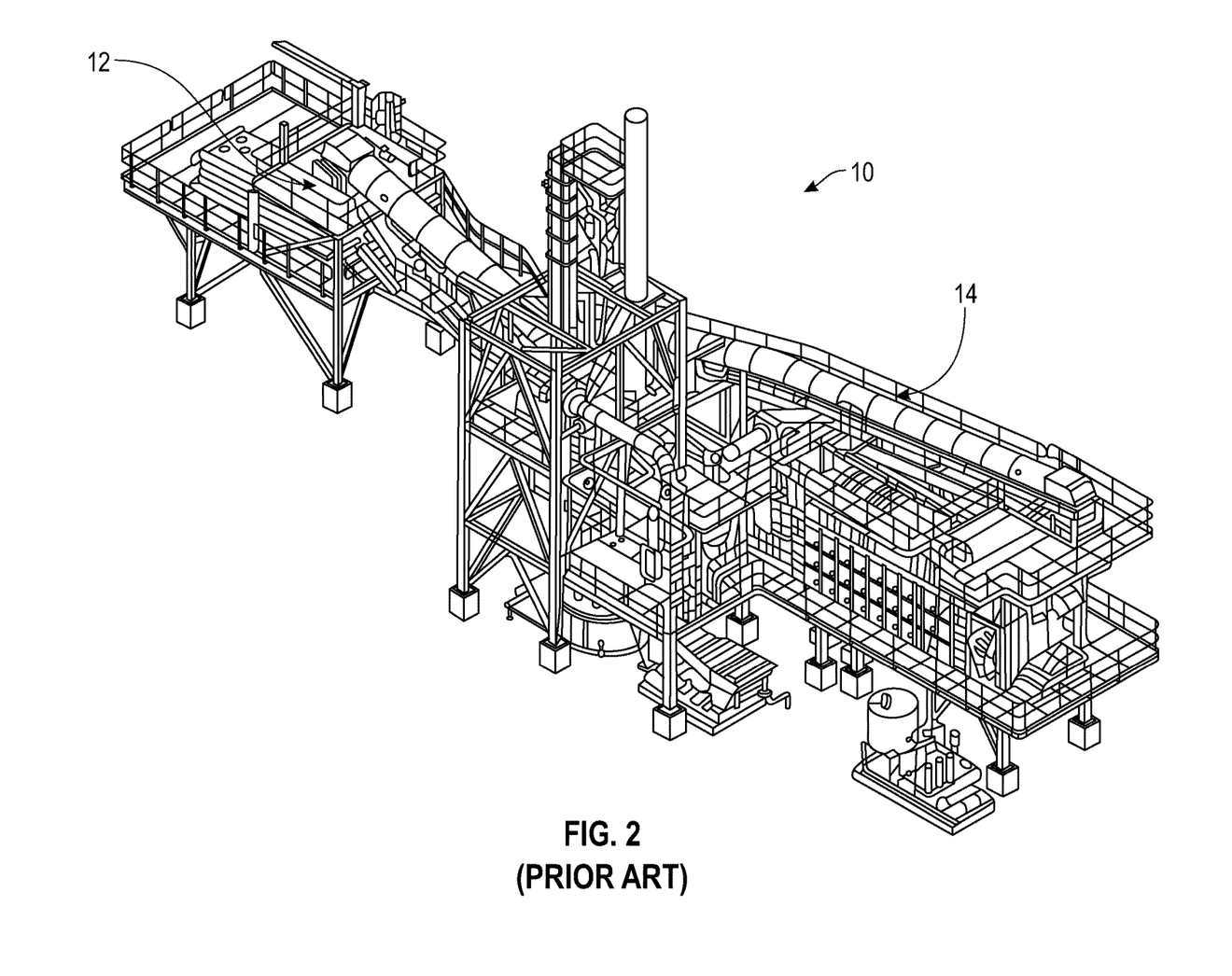
FIG. 2 depicts a conventional/traditional granulator system having a screening section and a return conveyor section, and encompassing a large footprint of space for placement.

FIG. 2 depicts a conventional/traditional granulator system 10 having a screening section 12 and a return conveyor section 14, and encompassing a large footprint of space for placement. Such a representative system, for example, is presented by the Enersul GXM1™ system.

In this system, the screening process section 12 separates undersized granules (less than 2 mm) from the product size granules, which allows the undersized granules to be recycled to the drum inlet via the return conveyor section 14 as sulfur seeds, and the process is then repeated. This feedback loop screening process ensures that no undersized granules exit the system and end up in the downstream storage.

Figure 3:
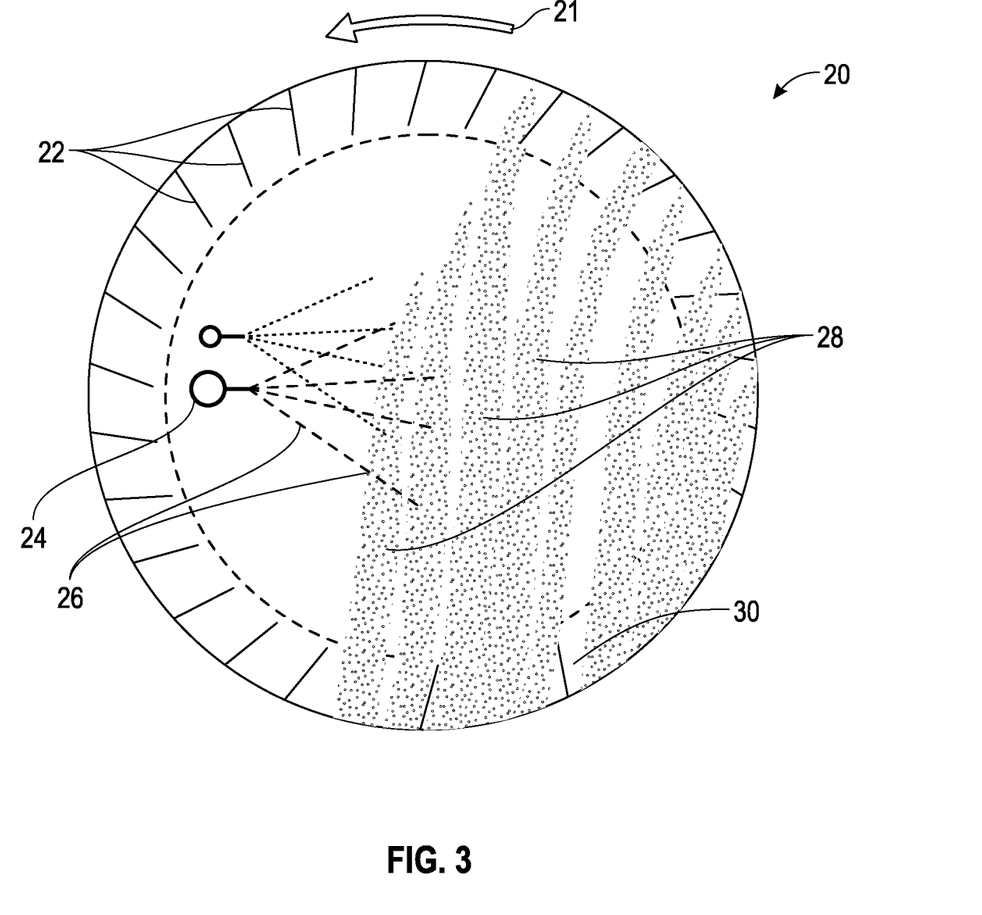
FIG. 3 depicts a cross-sectional view of a drum of a granulation process, where small sulfur seeds are repeatedly coated with a liquid sulfur spray and cooled with a water droplet spray.

FIG. 3 depicts a cross-sectional view of the drum of a granulation process. The drum is substantially cylindrical in shape, having a longitudinal axis and a radius As noted above, the granulation process is a size enlargement process where small sulfur seeds are repeatedly coated with a liquid sulfur spray and cooled with a water droplet spray. This creates spherical granules which are free of voids.

Drum 20 is depicted with a plurality of essentially identical particle-lifting flights 22. The flights 22 are typically equally spaced around the inside surface of the drum, and each flight extends longitudinally (axially) approximately along the length of the drum, preferably angled with respect to the drum radius. The flights capture the solid sulfur particles, seeds and granules, and raise them to the upper portion of the drum. The flights are angled radially inwards such that upon rotation of the drum in the direction of arrow 21, the flights will hold particles/seeds/granules and carry them upwards with the rotation until gravity acts to have the granules fall towards the bottom portion of the drum, exposing the constituent components to transverse directional sprays. The flights are generally flat so that each flight will have dropped essentially all of the particles it is carrying by the time the flight has moved a short distance near or past the highest point in the drum. This produces a constant shower of falling sulfur components—forming a particle "curtain".

At least one external sulfur header or conduit 24 extending longitudinally within the drum has a series of sulfur spray nozzles. The sulfur header 24 sprays liquid sulfur 26 on the falling curtain 28 of sulfur seeds and granules, which is constantly fed by the rotatably lifted flights 22 through the counterclockwise rotating drum 20, as viewed from the granule extraction end of the drum. The falling curtain 28 of sulfur granules and seeds forms a sulfur bed 30 of sulfur granules located at the bottom of the rotating drum 20, which is then repeatedly raised by the flights. This figure depicts a single chamber header spraying the falling granules and seeds with liquid sulfur. By single chamber, it is meant to describe an external sulfur header where only one set of spray nozzles at approximately equal pressure and flow rate spray the falling curtain of sulfur components.

The sulfur spray is generated by nozzles aligned on the header. The nozzles are generally spaced horizontally in the direction of movement of the particles in the bed, and spray atomized liquid sulfur at a predetermined pressure (e.g., 200 psi to 260 psi) onto the curtain of falling solid sulfur particles. The nozzles may be aimed or disposed at a predetermined angle from a horizontal plane traversing through the center, longitudinal axis of the drum.

The orifice size and spray angle of the nozzles may be selected and/or configured for optimum sulfur granulation formation. The nozzles may be selected for a flat fan spray (tapered, even, or deflected), a conical spray (hollow cone or full cone), or a deflected spray. Generally, a plurality of spray nozzles is used in a single pass header design such that the spray pattern of adjacent nozzles overlaps in order to provide uniform coverage across falling curtains of particles.

Water is finely atomized such that as the water evaporates the heat of vaporization is taken from the air, thus cooling it, which in turn cools the granules. Reference is made to U.S. Pat. No. 4,213,924 titled, "GRANULATION AND COATING BY IMPROVED METHOD OF HEAT REMOVAL", issued to Shirley, Jr. on Jul. 22, 1980, for a discussion of the use of atomized water as a means to control the temperature of the solid particles within a granulation drum. The temperature of the solid sulfur components in various portions of the drum may be suitably controlled by controlling the volume of atomized water sprayed in these portions through nozzles.

Figure 4:
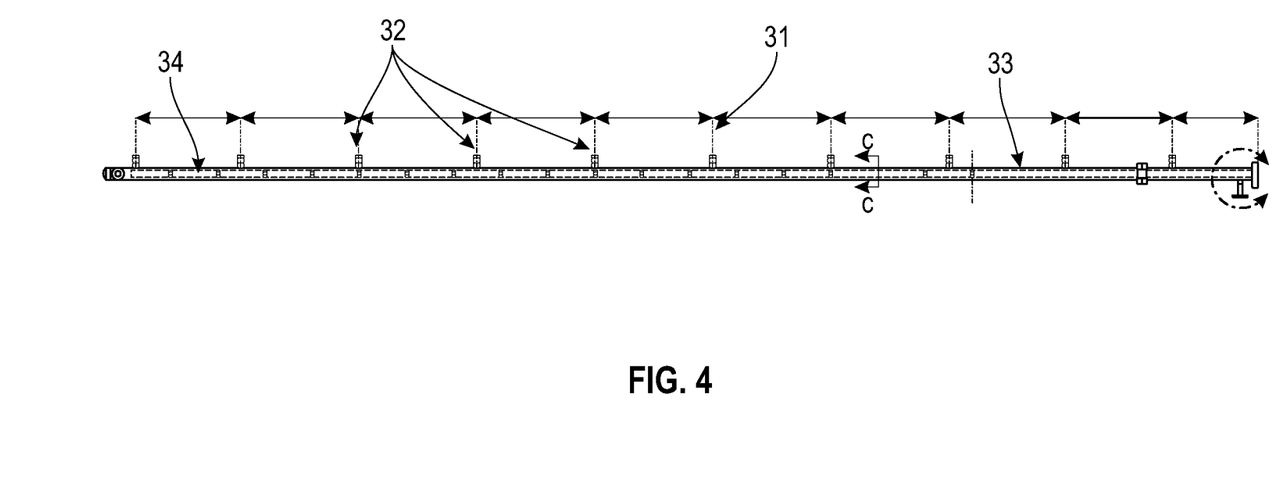
FIG. 4 is an elevational view of a traditional single chamber sulfur spray header assembly.

FIG. 4 is an elevational view of a single chamber sulfur spray header assembly 31. Typically, the sulfur header is sloped in the drum. Nozzles 32 are situated longitudinally about the header. An internal single pipe 34, coaxial with the external header pipe 33, carries molten sulfur to each of the nozzles under approximately the same flow rate and pressure.

Figure 5:
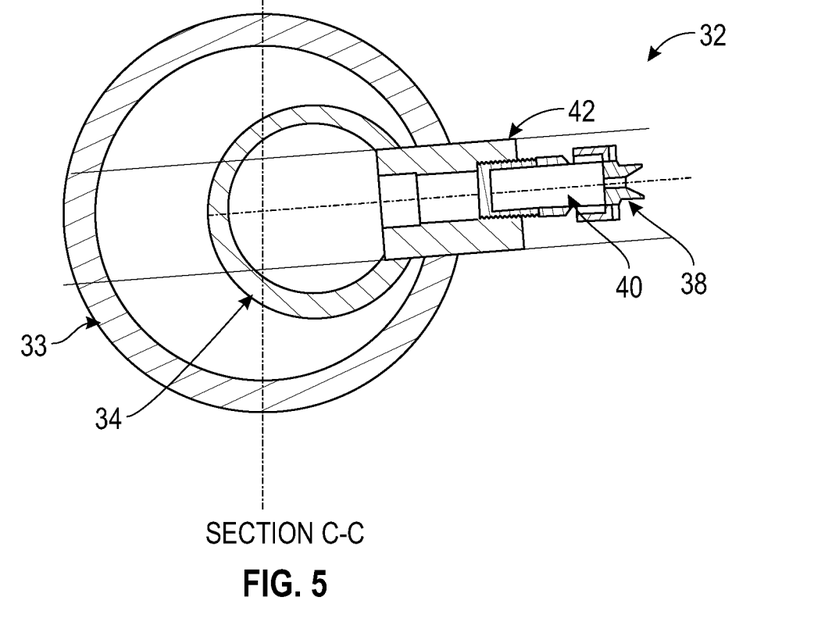
FIG. 5 is a cross-sectional view of the elevational view of FIG. 4 at section C-C.

FIG. 5 is a cross-sectional view of the elevational view of FIG. 4 at section C-C. This view depicts the nozzle 32 installation angle.

Figure 6:
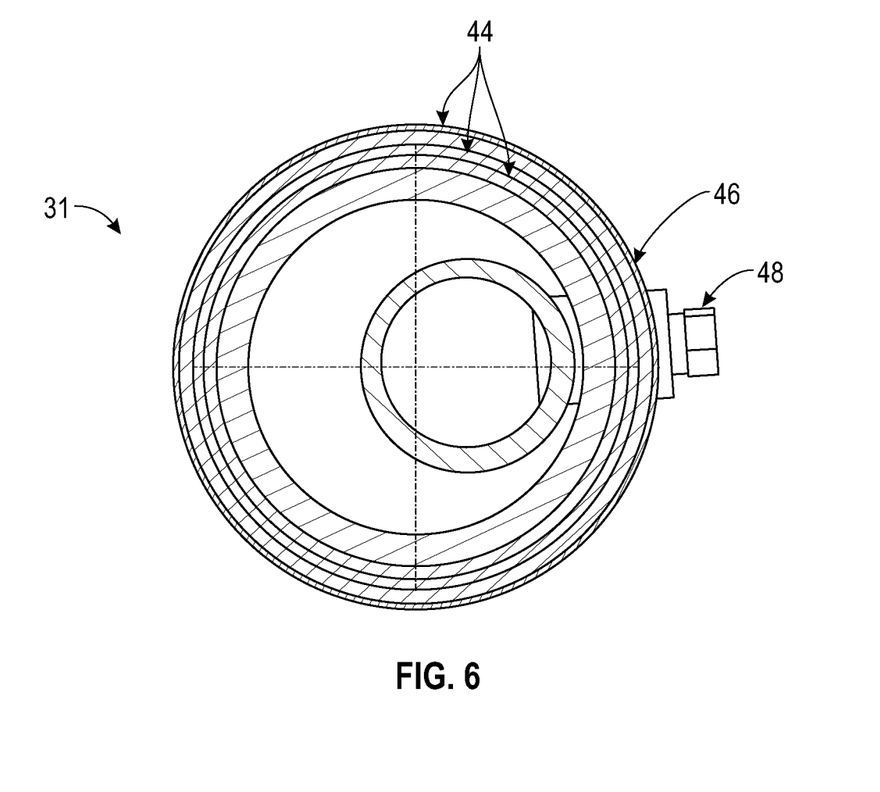
FIG. 6 depicts the insulation wrapping of the external casing pipe of the sulfur spray header assembly of FIG. 4.

In this example, external header pipe 33 is depicted as a pipe extending the approximate length of the drum. Generally, this pipe is approximately 4 inches in diameter for optimum use, although other diameter sizes are not prohibited, and may be predetermined based on the anticipated flow through the pipe. Internal pipe 34 is of a smaller diameter, generally on the order of half the diameter of the external header pipe, which in the instance of the present embodiment would be approximately 2 inches in diameter. Internal pipe 34 is in fluid communication with spray tip 38, held by tip retainer 40 and coupling 42. As depicted in FIG. 6, completing the installation, wide, flexible ceramic or fiberglass insulation strips 44 are installed within external header pipe 33. A stainless steel sheet cladding 46 encompasses the outer portion of the header, and a hex head pipe plug 48 secures the nozzle.

Figure 7:
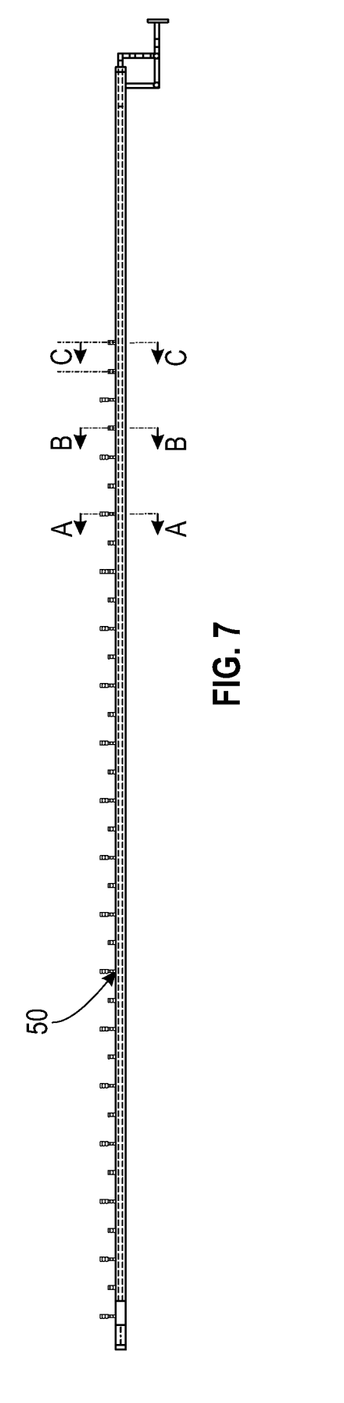
FIG. 7 depicts an elevational view of a process water spray header.

FIG. 7 depicts an elevational view of a process water spray header 50. This header design is similar to the sulfur header design insomuch as a single internal pipe 54 is presented within an external pipe 52. Internal pipe 54 feeds the water spray nozzles.

Figure 8:
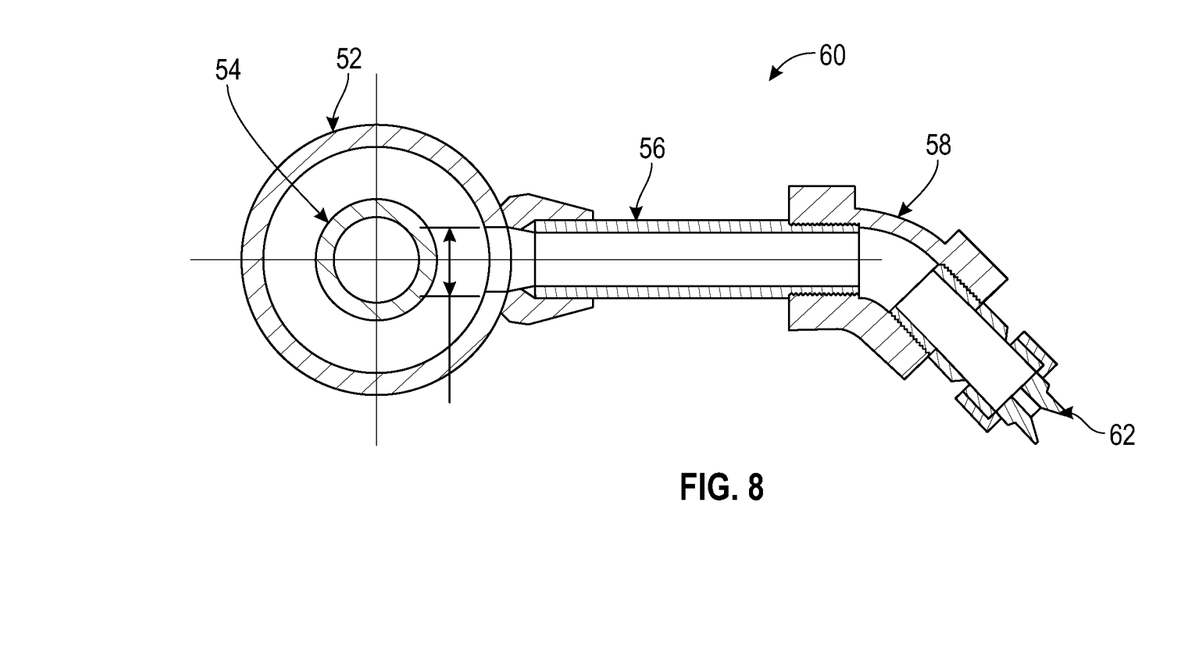
FIG. 8 depicts a curved water spray nozzle extended from the water spray header pipe of FIG. 7.

FIG. 8 depicts a curved water spray nozzle 60 extended from the water spray header pipe 52. A 2 inch diameter pipe 52 is used with a ¾ inch diameter inner tube 54 that connects to a pipe nipple 56 and a curved elbow 58, which terminates in spray tip 62.

In prior art designs, within both the sulfur and water header assemblies, the inner pipes or tubes within an external header conduit extend approximately the entire length of the header external conduit, respectively, and are in fluid communication with each respective nozzle simultaneously, ultimately delivering approximately the same flow rate and pressure to each nozzle.

In the present invention, a single chamber sulfur header is replaced by a double chamber header that facilitates and assists in controlling the required granule size distribution. The sulfur header assembly consists of at least two pipes inside an external header conduit. In one embodiment, at least one of the internal pipes is not coaxial with the external casing pipe.

The flow of sulfur through each of the internal pipes is controlled separately (preferably two internal pipes, although more than two is possible), providing a different flow rate and pressure through a corresponding set of nozzles for each pipe. (In contrast, in the traditional single chamber design, all the nozzles are subject to the same flow rates and pressures from a single pipe.) A set of nozzles in the double chamber header design is dedicated to a single internal pipe. In this regard, there are a plurality of nozzles associated with each internal pipe. In one embodiment, typically ten nozzles are associated with a first internal pipe, although the actual number is arbitrary and predicated in part on the longitudinal length of the drum. This first set or nozzles are referred to as "seed" nozzles because they influence the generation of sulfur seeds that are then subject to further enlargement into sulfur granules. Adjustments may be made to the seed generating segment of the sulfur header design by varying the pressure, flow, or the nozzle opening size to modify the quantity of seed produced and further control the particle growth while effectively maintaining constant production rate.

The next set of nozzles are generally placed "upstream" of the first set of nozzles, and represent the "coating" nozzles used to spray the particles for granule enlargement. Typically, this set of nozzles total approximately twice as many as the first set (generally on the order of twenty-five), although the actual number may vary. This second set of nozzles stem from a second internal pipe distinguishable from the seed nozzles, which originate from the first internal pipe. The second set of nozzles are "upstream" of the first set of nozzles because the second internal pipe holding the second set of nozzles extends further in the drum than the first internal pipe, or at least the placement of the second set of nozzles in the second internal pipe extends beyond the placement of the first set of nozzles in the first internal pipe.

Figure 9:
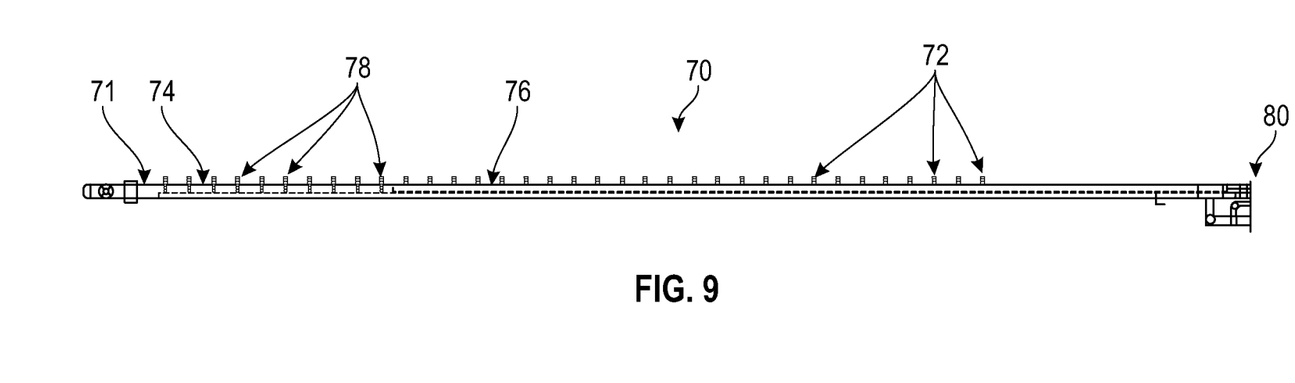
FIG. 9 depicts an elevational view of the sulfur header assembly design of the present invention.

FIG. 9 depicts an elevational view of one embodiment of the sulfur header assembly design 70 of the present invention. An internal pipe 76 is located within an external header or casing conduit 71. External header 71 has a length in a longitudinal direction extending approximately the length of the drum (not shown). External header 71 is generally cylindrical in shape, having a predetermined diameter and a predetermined length. Internal pipe 76 extends only partially the length of external casing conduit 71 pipe. In this exemplary embodiment, sulfur coating nozzles 72 are the first twenty-five nozzles being fed with molten sulfur from the sulfur source input 80, as shown from right-to-left. Thus, internal pipe 76 acts to generate sulfur seeds for further enlargement longitudinally down the drum. In this example, the last of the coating nozzles 72, downstream of sulfur source input 80, end about two-thirds (⅔) the length of the external header conduit, although the actual length of the internal pipe may vary. Nozzles 78 follow, and are in fluid communication with a second internal pipe 74 (not the internal pipe 76). In this manner, nozzles 78 may be subjected to different flow rates, pressures, and have a nozzle size that is different from the coating nozzles to better effectuate seed generation.

Figure 10:
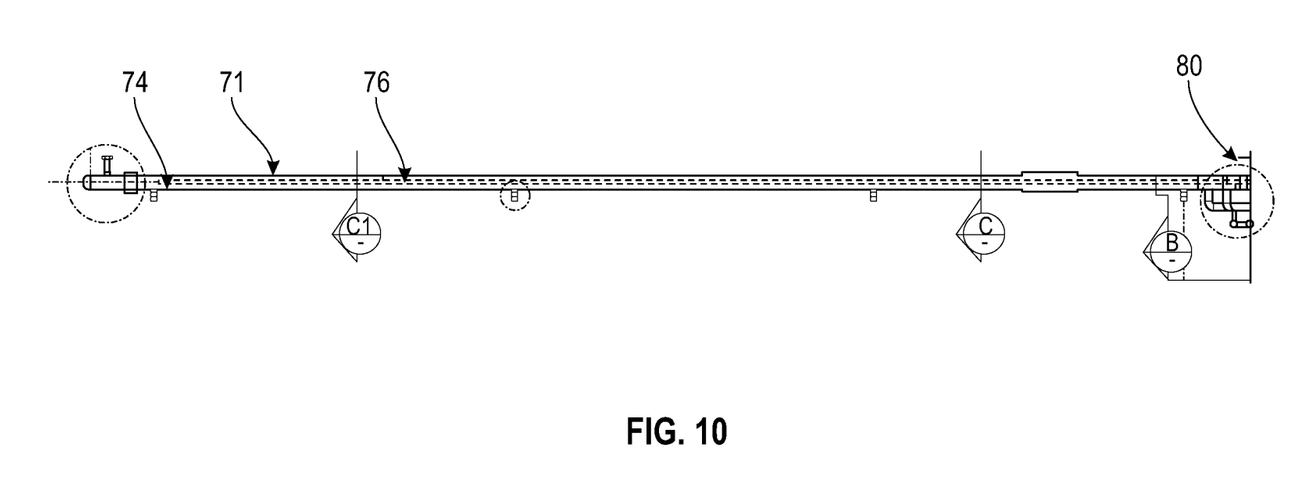
FIG. 10 depicts a second elevational view of the sulfur header design of FIG. 9, identifying cross-sectional points for further illustration of the internal structure.

FIG. 10 depicts a second elevational view of the sulfur header design 70 identifying cross-sectional points for further illustration of the internal structure.

Figure 11:
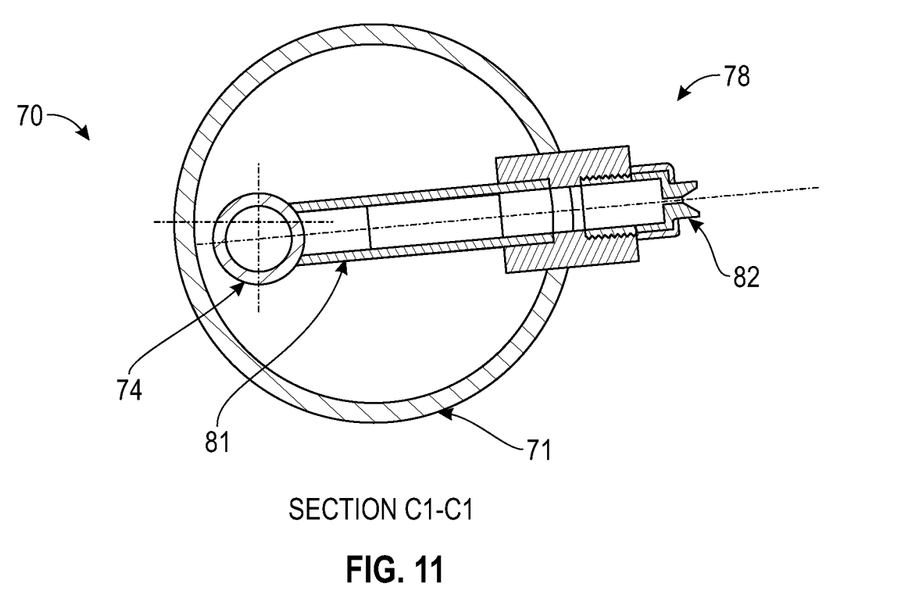
FIG. 11 depicts a cross-sectional view of the sulfur header assembly of the present invention taken at point C1-C1 of FIG. 10.

FIG. 11 depicts a cross-sectional view of the sulfur header assembly 70 of the present invention taken at point C1-C1 of FIG. 10. Internal pipe 74 feeds nozzle 78, having a spray outlet 82, via a conduit or pipe extension 81 located within external header conduit 71. As depicted in FIG. 10, internal pipe 74, having its own set of spray nozzles extends beyond internal pipe 76, and in at least one embodiment, is not in fluid communication with internal pipe 76. Alternatively, the placement of the nozzles 72 on the first internal pipe 76 does not extend beyond the placement of the nozzles 78 in the second internal pipe 74, in the direction of the drum longitudinal axis. Thus, nozzles 78 are independent of, and fluidly extricated from, the operation of nozzles 72. Generally, the nozzles are directed at an angle from the horizontal, depicted in FIG. 11 at about five-degrees (5°) off horizontal axis, although other angles are not precluded depending upon the amount of exposure of the sulfur spray to the falling curtain of sulfur components.

Figure 12:
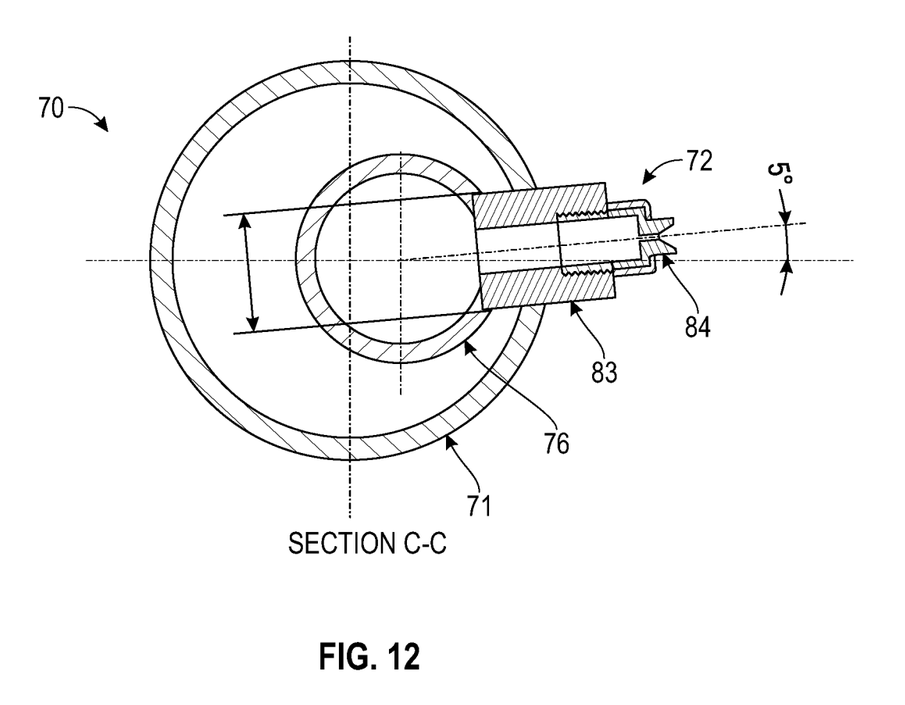
FIG. 12 depicts a cross-sectional view of the sulfur header assembly of the present invention taken at point C-C of FIG. 10.

FIG. 12 depicts a cross-sectional view of the sulfur header assembly 70 of the present invention taken at point C-C of FIG. 10. In at least one embodiment, internal pipe 76 feeds nozzle 72 having spray outlet 83 via a pipe extension 81, traversing through external header conduit 71.

As depicted in FIG. 10, internal pipe 76 terminates (from right to left) before internal pipe 74 and, in at least one embodiment, is not in fluid communication with internal pipe 74. Or conversely, the spray nozzles of internal pipe 76 terminate before the spray nozzles of internal pipe 74, independent of the length of the internal pipes. In the embodiment depicted, neither internal pipe is coaxial with the external header casing 71 (although it is possible for a coaxial configuration of one or both internal pipes, and such a configuration is not excluded in the design). In this illustrative embodiment, nozzles 72 are independent of, and fluidly extricated from, the operation of nozzles 78. Shown here, nozzles 72 are directed at an angle from the horizontal, depicted here at about 5° off horizontal axis.

Figure 13:
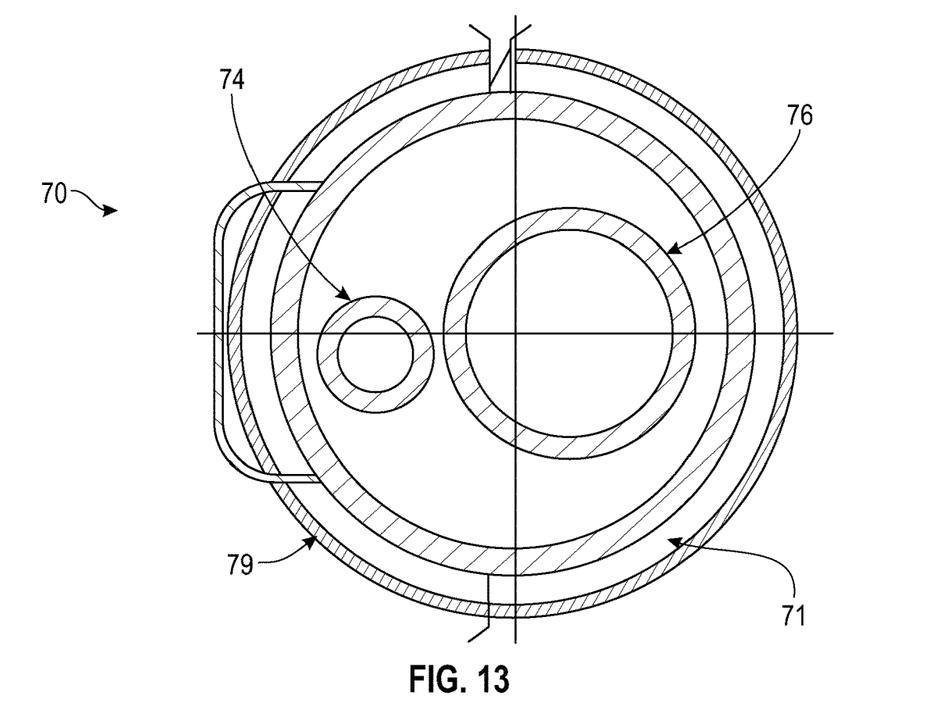
FIG. 13 is a cross-sectional view of the sulfur header assembly of the present invention taken at Section B of FIG. 10.

FIG. 13 is a cross-sectional view of the sulfur header assembly 70 of the present invention taken at Section B of FIG. 10. As shown, both internal pipes 74, 76 are enclosed in external header conduit 71, and are off axial center of external header conduit 71.

Figure 14:
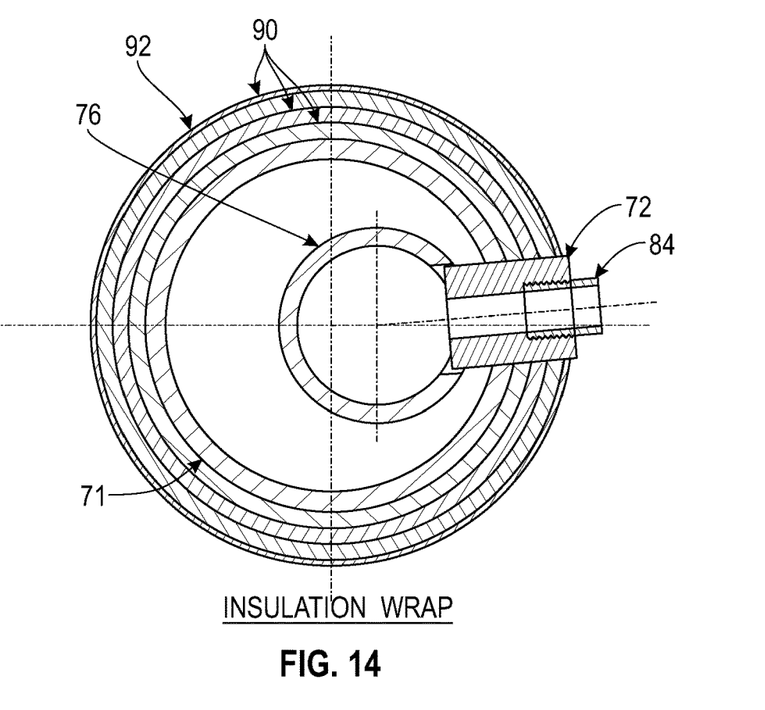
FIG. 14 depicts insulation wrap of external casing pipe of the sulfur header assembly of FIG. 9.

FIG. 14 depicts insulation wrap of external header conduit 71. Insulation 90 and cladding 92 are external to the casing pipe 71, and present openings for each nozzle. The insulation protects the external header conduit from the adverse environment and helps maintain temperature. Typically, the insulation is in three layers with cladding on the outermost exterior.

The method of seed generation and sulfur granule enlargement is performed simultaneously using the new header design. In this novel design, it is not necessary for the rotating drum to be fed sulfur particles for creating a starting bed of particles, although such a method step is not precluded. A low sulfur flow rate and pressure in the initial set of sprayers can create the necessary start-up bed of particles. The separate seed generating segment can adjust the amount of seed produced and further control the particle growth while maintaining a constant production rate. Since the drum axis has a slight inclination from the horizontal, as the drum rotates, any sulfur particles within the drum move from the bottom of the drum to the top, fall in curtains in front of the sprayers and advance towards its lower end. As the sulfur seeds progress longitudinally down the drum, they are exposed to molten sulfur spray from a second bank of nozzles, and are enlarged to form sulfur granules. In this process, the first exposure of any sulfur particles in the drum is to a bank of nozzles spraying molten sulfur onto the sulfur particles to form sulfur seeds. As the sulfur seeds progress longitudinally down the drum due to the inclination of the drum during rotation, the sulfur seeds are exposed to molten sulfur spray from a second bank of nozzles, and are enlarged to form sulfur granules. The rotating drum and flights/lifters continuously expose the sulfur particles/seeds/granules to the spraying headers such that the resultant product of adequately sized sulfur granules exit the drum without requiring either a screening process generally used to separate the sulfur granules that are unacceptably small, or a return conveyor to return the unacceptably small sulfur seeds to the granulator generation unit. This dual-spraying technique eliminates the need for a process screen or a return conveyor belt since the efficiency of the sulfur seed enlargement is significantly better than that of the prior art. This is a self-initiating process, that allows for further internal seed generation without providing further initial sulfur particle bed generation.

The elimination of the screening process equipment and the return conveyor significantly limits the footprint of the granulation processing system. This is advantageous for the implementation of the unit within a production facility, where space is of a premium, and the removed equipment is quite large.

Figure 15:
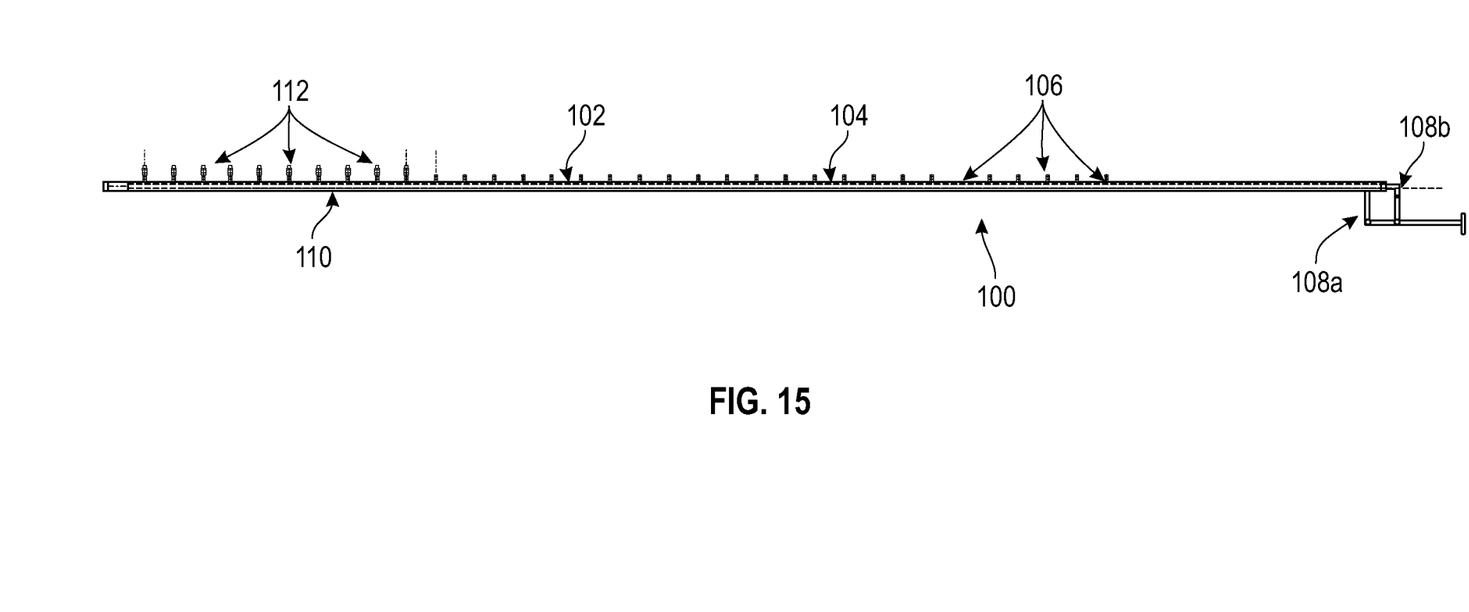
FIG. 15 depicts an elevational (plan) view of the water header design of the present invention.

FIG. 15 depicts an elevational (plan) view of the water header design 100 of the present invention. An internal pipe 102 is located within external header conduit 104 and feeds at least a portion of nozzles 106. In a similar manner to the sulfur header design, in at least one embodiment, the water header assembly may include two internal pipes, one of which extends only partially the length of external header conduit 104. In this exemplary embodiment, water nozzles 106 are fed with one of two possible input sources 108a,b. Internal pipe 102 may be terminated within external header conduit 104 prior to reaching the end of external header conduit 104. In this manner, a second internal pipe 110 feeds the water nozzles 112 further downstream of initial nozzles 106. Water nozzles 112 are fed by the other water input source, such that the two sets of nozzles have independent flow rates and pressures. In a separate embodiment, a single water pipe or conduit may be utilized if pressure differentials between different water spray nozzles are not desired.

Figure 16:
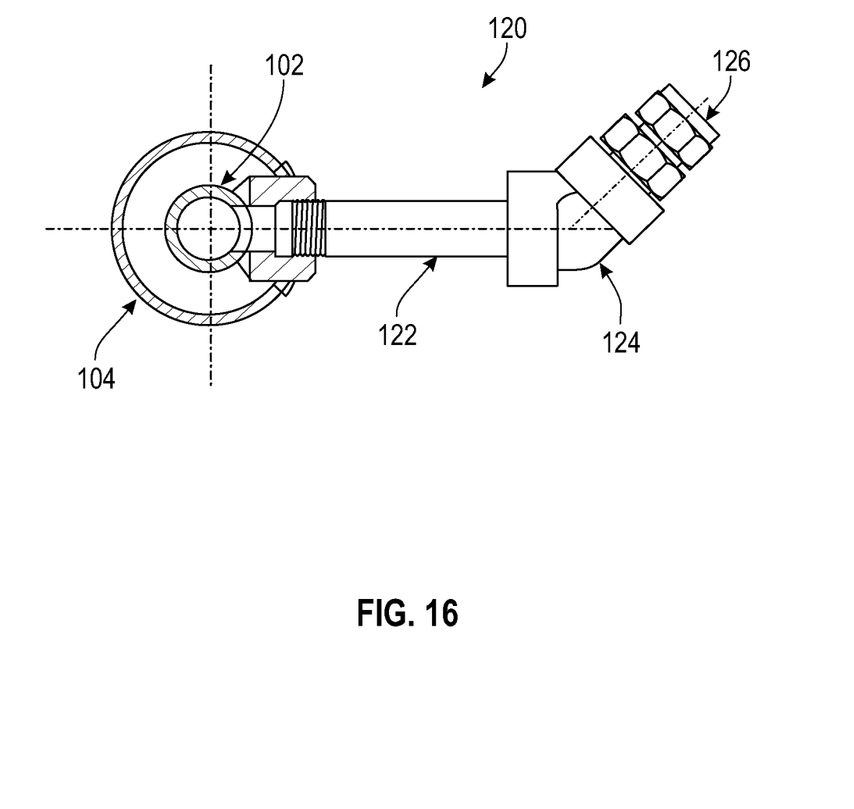
FIG. 16 depicts an exemplary angled water nozzle for the water header assembly of FIG. 15, showing an extension pipe extending radially outwards and connected to an angled, elbow portion, which terminates at a spray outlet.

FIG. 16 depicts an exemplary angled water nozzle 120 for the water header assembly 100 showing an extension pipe 122 extending radially outwards and connected to an angled, elbow portion 124, which terminates at the spray outlet 126. Water nozzle 120 may be located in place of either water nozzle 106 or 112. In this example, water nozzle 120 is fed by internal pipe 102, which is in fluid communication with one of the water input sources 108a,b.

In an embodiment where there are two internal pipes to deliver water, the water nozzles connected to second internal pipe 110 are separate from the water nozzles connected to first internal pipe 102, and as such may be designed to realize different flow rates and different pressures. The second set of water nozzles may also be angled differently than the first set. It remains possible to utilize a single water delivery conduit in conjunction with the external sulfur header design of the present invention, while still providing the efficiency and a smaller footprint for the system.

The shorter internal pipe will typically terminate about two-thirds (⅔) the length of the external header conduit, although the actual length of the shorter internal pipe may vary. Conversely, the spray nozzles of one internal pipe may terminate about two-thirds (⅔) the length of the external header conduit even if the internal pipe extends the length of the external header conduit. The result to be achieved is for the first set of spray nozzles not to extend the full length of the drum longitudinal axis, and the second set of spray nozzles to extend at least beyond the first set along the drum longitudinal axis.

Figure 17:
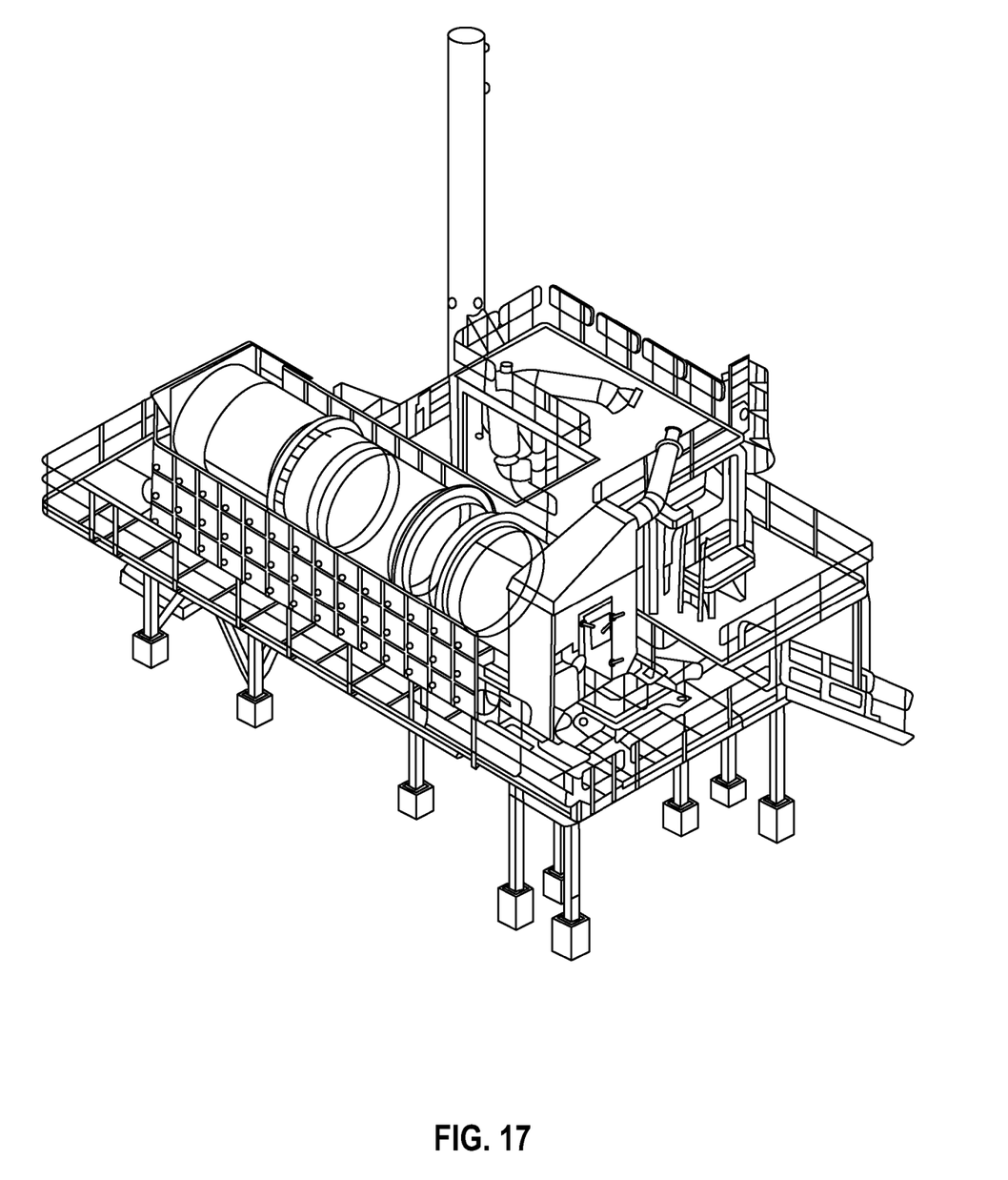
FIG. 17 depicts a sulfur process granulation system of the present invention with significantly reduced footprint for the processing sulfur granules, eliminating or reducing significantly the need for a return conveyor and a screening section.

As shown in FIG. 17, this modification results in a significantly reduced footprint for the process granulation system as the screening section and the return conveyor section are significantly reduced or effectively eliminated.

The reduction in footprint advantageously does not come at a cost for efficiency. The double chamber header design for the spraying of molten sulfur generates seeds for further granule production while simultaneously enlarging sulfur granules. This allows for the elimination of a screening process section and a conveyor section, which significantly reduces the footprint of sulfur granulation process machinery.

A method of sulfur seed generation and sulfur granule enlargement for processing sulfur is also taught. The method employs the unique sulfur header design of the present invention with dual internal piping structures for feeding two sets of spray nozzles, and possibly utilizing in tandem a water header design having a single or dual internal piping structure.

The method of seed generation and sulfur granule enlargement, includes: rotating a drum having a longitudinal axis and a length; introducing sulfur particles within the drum at a first location; injecting molten sulfur into a first internal pipe of an external header assembly within the rotating drum, the external header assembly extending approximate the length of the drum, the first internal pipe extending a partial length of the external header assembly; injecting molten sulfur into a second internal pipe of the external header assembly, the second internal pipe extending a length within the external header assembly further than the first internal pipe; generating a first sulfur spray from a first set of nozzles attached to the first internal pipe to generate sulfur seeds from the sulfur particles; capturing the sulfur particles and sulfur seeds in flights attached to an internal surface of the drum, and carrying the sulfur particles and sulfur seeds to a top portion of the drum until the sulfur particles and sulfur seeds fall under gravitational force; moving the sulfur particles and sulfur seeds about a length of, and with respect to, the longitudinal axis; generating a second sulfur spay from a second set of nozzles attached to the second internal pipe to coat the sulfur particles and seeds to form sulfur granules; and exiting the sulfur granules from the drum at a second location.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A header assembly for generating and enlarging sulfur seeds into sulfur granules, comprising:
   an external header conduit having a width and a longitudinal length greater than said width;
   a first internal pipe within said external header conduit, extending a partial length of said external header conduit length;
   a second internal pipe within said external header conduit, extending a longer length inside said external header conduit than said first internal pipe;
   a first set of nozzles attached to said first internal pipe;
   a second set of nozzles attached to said second internal pipe;
   said first set of nozzles having predetermined nozzle size openings, pressures, and/or flow rates configured to influence the generation of sulfur seeds; and
   said second set of nozzles having predetermined nozzle size openings, pressures, and/or flow rates configured to coat and enlarge said sulfur seeds into sulfur granules;
   wherein at least one of said first and second internal pipes is not coaxial with said external header conduit.

2. The header assembly of claim 1 wherein said external header conduit is approximately cylindrical in shape.

3. The header assembly of claim 1 wherein said first set of nozzles, nozzle size openings, pressures, and/or flow rates are predetermined to generate a sulfur spray to effectuate seed generation.

4. The header assembly of claim 1 wherein said nozzle size openings of said first set of nozzles are not equal in size to said nozzle size openings of said second set of nozzles.

5. The header assembly of claim 1 wherein said second set of nozzles predetermined nozzle size openings, pressures, and flow rates generate a sulfur spray different than said first set of nozzles to effectuate sulfur seed enlargement.

6. The header assembly of claim 1 wherein at least one set of said first or second set of nozzles is configured extending outwards from its respective first or second internal pipe, having an angle with respect to a horizontal plane extending through said external header conduit.

7. The header assembly of claim 1 wherein said first internal pipe extends approximately two-thirds (⅔) of said external header conduit length.

8. A header assembly for delivering at least two separate sets of fluid sprays for generating and enlarging sulfur seeds into sulfur granules, comprising:
   an external header conduit having a width and a longitudinal length greater than said width;
   a first internal pipe within said external header conduit, extending a partial length of said external header conduit length;
   a second internal pipe within said external header conduit, extending a longer length inside said external header conduit than said first internal pipe;
   a first set of nozzles attached to said first internal pipe;
   a second set of nozzles attached to said second internal pipe and situated upstream of said first set of nozzles in relation to a direction of fluid of said fluid sprays;
   said first set of nozzles having predetermined nozzle size openings, pressures, and/or flow rates configured to produce a first liquid spray of a first pressure, first flow rate, and first spray width; and
   said second set of nozzles having predetermined nozzle size openings, pressures, and/or flow rates configured to deliver a second liquid spray of a second pressure, second flow rate, and second spray width.

9. The header assembly of claim 8 wherein at least one set of fluid sprays includes molten sulfur.

10. The header assembly of claim 8 wherein said external header conduit is approximately cylindrical in shape.

11. The header assembly of claim 10 wherein at least one of said first and second internal pipes is not coaxial with said external header conduit.

12. The header assembly of claim 8 wherein at least one set of said first or second set of nozzles is configured extending outwards from its respective first or second internal pipe, having an angle with respect to a horizontal plane extending through said external header conduit.

* * * * *